(12) United States Patent
Marchese et al.

(10) Patent No.: US 6,213,481 B1
(45) Date of Patent: Apr. 10, 2001

(54) ASSEMBLY CONSISTING OF A SUPPORT STRUCTURE AND OF A TROLLEY FOR TRANSPORTING EQUIPMENT

(75) Inventors: Christophe Marchese, Orleans; Igor Mazabrey, Rambouillet, both of (FR)

(73) Assignee: ALM, Ardon (FR)

( * ) Notice: Subject to any disclaimer, the term of this patent is extended or adjusted under 35 U.S.C. 154(b) by 0 days.

(21) Appl. No.: 09/345,374

(22) Filed: Jul. 1, 1999

(30) Foreign Application Priority Data

Jul. 1, 1998 (FR) .................................................. 98 08400

(51) Int. Cl.[7] .................................................. A61G 13/00
(52) U.S. Cl. .......................... 280/35; 280/47.35; 280/651; 248/282.1; 248/324
(58) Field of Search ................................. 280/35, 47.18, 280/47.34, 47.35, 651; 248/276.1, 282.1, 274.1, 343, 324

(56) References Cited

U.S. PATENT DOCUMENTS

| | | | |
|---|---|---|---|
| 2,804,979 | * | 9/1957 | Lassiter .................................. 212/59 |
| 3,807,574 | * | 4/1974 | Lanza .................................... 211/207 |
| 4,023,771 | * | 5/1977 | Walchek ................................ 249/139 |
| 5,348,324 | | 9/1994 | Trotta ...................................... 280/35 |
| 5,377,370 | * | 1/1995 | Foster ..................................... 5/503.1 |
| 5,490,652 | * | 2/1996 | Martin ................................. 248/282.1 |
| 5,618,090 | * | 4/1997 | Montague et al. .................... 312/209 |
| 5,797,568 | * | 8/1998 | Gongora et al. ................... 248/122.1 |
| 6,073,942 | * | 6/2000 | Heneveld, Sr. .................. 280/33.991 |

FOREIGN PATENT DOCUMENTS

| | | |
|---|---|---|
| 91 06 187 | 8/1991 | (DE) . |
| 298 05 019 U | 5/1998 | (DE) . |
| 0 257 299 | 3/1988 | (EP) . |
| 0 603 093 | 6/1994 | (EP) . |
| 0 614 035 | 9/1994 | (EP) . |
| 0 614 036 | 9/1994 | (EP) . |
| 0 614 037 | 9/1994 | (EP) . |
| 0 681 822 | 11/1995 | (EP) . |
| 1 066 129 | 4/1967 | (GB) . |
| 2 083 878 | 3/1982 | (GB) . |
| WO 96/29636 | 12/1994 | (WO) . |

* cited by examiner

*Primary Examiner*—Brian L. Johnson
*Assistant Examiner*—Bridget Avery
(74) *Attorney, Agent, or Firm*—Young & Thompson (57) ABSTRACT

Support structure/transport trolley (C) assembly having a support structure (S), such as a ceiling mount intended for a hospital building treatment room, comprising at least one arm (2) equipped with one or more vertical columns (3) and a fixing device (1) allowing the structure (S) to be fixed to the ceiling or to a wall; a mobile transport trolley (C) bearing attachment (31) which cooperate with a receiving device (32) borne by a column (3) to allow the trolley (C) to be fixed to the column (3); and a lifting device (33) also borne by the trolley (C) capable of allowing the lifting of at least part of the trolley (C) after this trolley has been fixed to the column (3).

16 Claims, 8 Drawing Sheets

ASSEMBLY CONSISTING OF A SUPPORT STRUCTURE AND OF A TROLLEY FOR TRANSPORTING EQUIPMENT

BACKGROUND OF THE INVENTION

1. Field of the Invention

The present invention relates to an assembly formed, on the one hand, of a mobile trolley intended for transporting medical equipment or the like and, on the other hand, of an attachment support structure that can be fixed to a ceiling or to a wall, for example a ceiling mount for hospitals, with one or more arms which may or may not be articulated, comprising at least one column fitted with means of fixing the said trolley.

2. Description of the Related Art

Support structures, particularly ceiling mounts with one or more arms which may or may not be articulated, are commonly used in hospital establishments, particularly in operating theatres, anaesthetist or treatment rooms, where these structures are generally fixed to the ceiling so that they overhang the operating tables or the beds occupied by the patients.

Conventionally, these ceiling mounts or the like fulfil several functions, namely:

- they support all or some of the equipment and apparatus employed during treatment;
- they fulfil functions of storing some of the equipment;
- as they are generally articulated and support the apparatus, they allow easy and alterable movement of this apparatus around the bed or operating table;
- they contain all of the ducting conveying the gases or medical fluids, and the electric power supply cables for the treatment apparatus.

Customarily, a ceiling mount comprises at least one base element intended to be fixed to the ceiling or to the wall, and on which one or more ceiling mount arms, which may or may not be articulated to the said base element, is or are mounted, which ceiling mount arms may be formed as several sub-parts articulated together.

In general, a ceiling mount arm, articulated or otherwise, comprises a column of vertical axis to which there are permanently fixed support elements capable of receiving treatment apparatus, trays or other elements for storing medical or similar equipment.

Mention may, for example, be made of existing devices comprising, at the lower end of their vertical-axis column, a kind of pod equipped with drawers, shelves and other storage accessories.

Such devices are in particular described in documents EP-A-0257299, EP-A-0614035, EP-A-0614036, EP-A-0614037, WO-A-94/29636, EP-A-0681822, EP-A-0603093, WO-A-94/27549 or GB-A-2083878.

However, the ceiling mounts described in the prior art exhibit certain drawbacks.

Thus, the existing devices customarily comprise one or more columns on which the various support elements are either permanently, that is to say irremovably, fixed, or fixed in such a way that they can only be rearranged with respect to one another if numerous manipulations, such as disassembling the said supports then subsequently reassembling them onto the column, are performed, which manipulations are generally accompanied by the need to disconnect and move all the items of apparatus arranged on the said support elements.

It will be readily understood that such manipulations are, on the one hand, tricky and irksome and, on the other hand, inadmissible given the loss of time they entail, the risk of damage to the treatment apparatus and the complexity of interconnecting the various items of apparatus.

A partial solution to this problem is provided by documents U.S. Pat. No. 4,993,683 and U.S. Pat. No. 5,040,765 which describe a system consisting, on the one hand, of a ceiling mount equipped with a column of vertical axis and, on the other hand, of a mobile trolley for transporting medical equipment, this trolley being fitted with castors allowing it to be moved. The column is equipped with means comprising parallel rails that can receive the mobile trolley and raise it in an upwards movement to lift it off the floor. The manipulating of the medical apparatus thus becomes easier, given that this device makes it possible to avoid any tricky moving of the apparatus; the apparatus and/or other items of equipment being placed directly on the trolley.

However, the lifting system proposed by these documents is rather complex, given that it employs rails that can move in terms of translation and in terms of rotation and which are actuated by cranks and gears arranged on the column.

Furthermore, this system has the drawback of being very bulky, especially with the trolley absent, and really rather incompatible with use in a hospital environment, particularly because of the presence of the rails and rail supports which are liable to form veritable "traps" for dust and germs.

SUMMARY OF THE INVENTION

The object of the present invention is therefore to propose an assembly consisting, on the one hand, of a support structure that can be fixed to a ceiling or to a wall, particularly a ceiling mount and, on the other hand, of a mobile transport trolley capable of receiving apparatus and/or supports for hospital equipment, which does not exhibit the aforementioned drawbacks, that is to say which allows for easy fixing of the trolley to the vertical-axis column of the ceiling mount, that is to say of the said support structure, and easy detachment therefrom.

Furthermore, according to the invention, the means allowing the transport trolley to be detached from the floor of the hospital building so as to secure it to the ceiling mount must be simple to operate and small in bulk.

In the context of the present invention, the mobile transport trolley is equipped with one or more support elements, that is to say with means for supporting the weight of an item of equipment, such as a tray, a stage, a pod, a shelf unit, a ramp, a drawer.

The present invention therefore relates to a support structure/transport trolley assembly comprising:

- an attachment support structure, such as a ceiling mount, intended to be fixed to a ceiling or to a wall comprising at least one arm equipped with at least one column of vertical axis (x-x') and fixing means allowing the said support structure to be fixed to a ceiling or to a wall,
- a mobile transport trolley,
- attachment means borne by the said trolley cooperating with receiving means borne by the said column and capable of allowing the trolley to be fixed and secured to the said column, and
- lifting means borne by the said trolley capable of allowing at least the lifting of at least part of the trolley after the said trolley has been fixed to the column.

In the context of the present invention, lifting of the trolley is understood to mean an operation that allows at least part of the trolley to be raised so that the trolley is no longer in direct contact with the floor.

Attachment support structure, such as a ceiling mount, with an arm which may or may not be articulated, is understood to mean that the structure is provided with at least one arm which is either articulated to a base element fixed to the ceiling or to a wall, or fixed permanently to the said base element.

From there, the arm/base element assembly may therefore be formed with a single part or of several parts connected together, and which may or may not be articulated to each other.

In other words, a support structure, such as a ceiling mount, having at least one column fixed directly to the base element also falls within the scope of the present invention because, in this case, the arm and the base element are as one, that is to say form a single part.

The assembly of the invention may have one or more of the following features:
- the mobile trolley comprises several castors, preferably at least 4 castors;
- the trolley also comprises support means, preferably trays, shelves or the like, the said support means being fixed to at least one trolley column borne by the said trolley;
- the trolley furthermore comprises retaining means arranged on the trolley column allowing the trolley to be kept pressed against the column at least when the trolley is attached to the said column and is raised off the floor;
- the column is essentially cylindrical and the retaining means are provided with a bearing surface that comes into contact with the column;
- the attachment means comprise at least one attachment hook, preferably at least two attachment hooks;
- the receiving means fixed to the column comprise at least one, and preferably at least two, attachment pins, at least one attachment pin being able to cooperate with at least one hook borne by the said trolley.

As a preference, the column is of essentially cylindrical or polygonal shape and/or is made of a material chosen from the group comprising metals, metal alloys and polymers.

Furthermore, the ceiling mount comprises one or two ceiling mount arms, each comprising a column.

The invention furthermore relates to a mobile transport trolley capable of equipping an assembly according to the invention, which comprises castors, allowing the said trolley to move along the floor, attachment means capable of allowing the trolley to be fixed to a column of an attachment structure and lifting means capable of allowing the trolley to be lifted when it is attached to the column.

Furthermore, in order to fix or attach a trolley to a support structure fixed to a ceiling, such as a ceiling mount, and comprising at least one arm equipped with at least one column of vertical axis (x-x') and fixing means, the procedure is as follows:
- the mobile transport trolley is brought into contact or close proximity with the column,
- the attachment means borne by the said trolley are fixed, i.e. attached, to receiving means arranged on the said column so as to make the attachment means cooperate with the said receiving means,
- the trolley is lifted by activating the lifting means in such a way as to raise at least part of the said trolley.

According to another aspect, the invention relates also to the use of a support structure/trolley assembly, particularly a ceiling mount/trolley assembly according to the invention, in a hospital building, preferably in a treatment room.

BRIEF DESCRIPTION OF THE DRAWING

The invention will now be described in greater detail with the aid of figures which are given by way of entirely non-limiting illustration.

DESCRIPTION OF THE PREFERRED EMBODIMENTS

Figure 1:
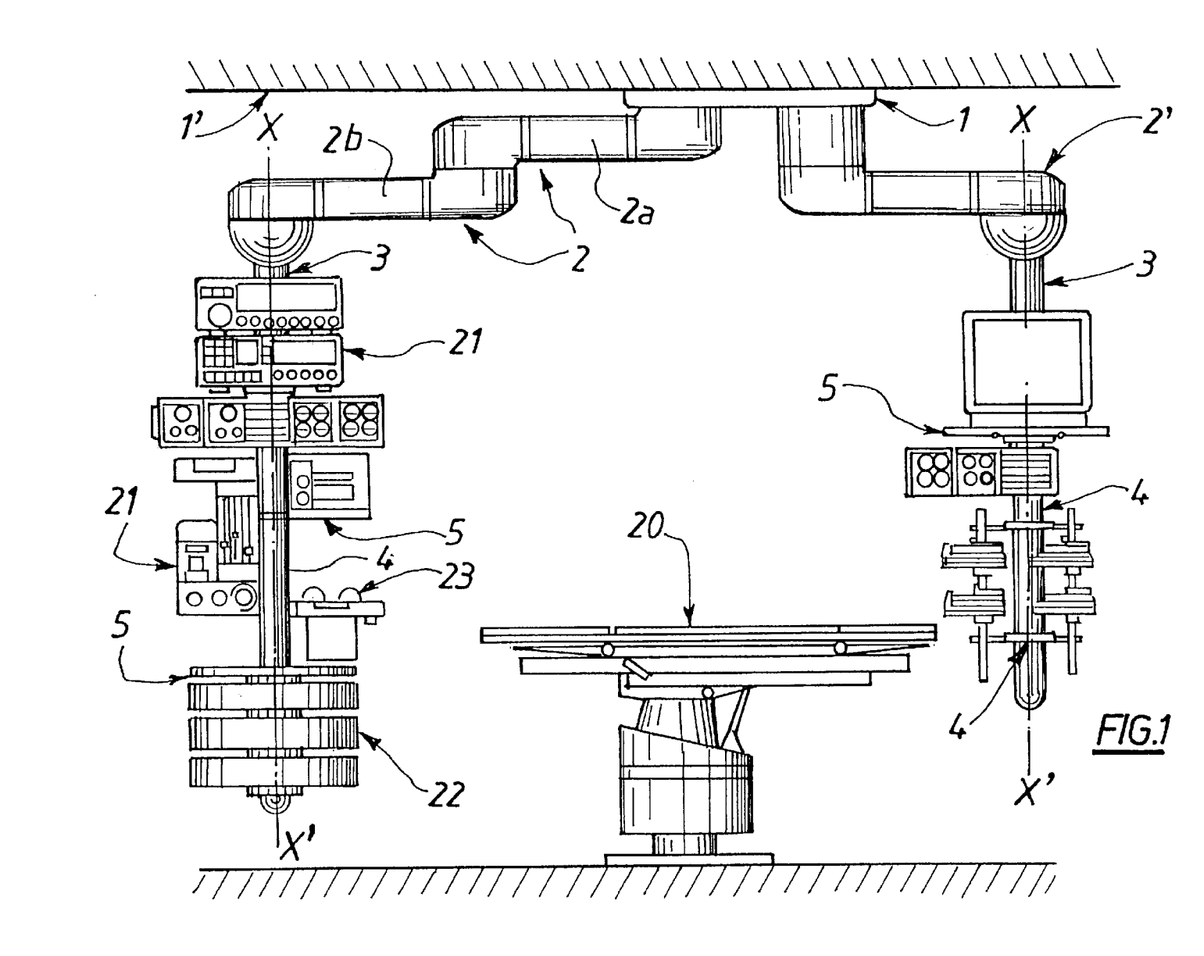
FIG. 1 depicts a conventional layout of a ceiling mount installed in an intensive care room in a hospital environment.

More specifically, FIG. 1 depicts a ceiling mount comprising a base element 1 fixed to a ceiling 1' of an intensive care room in a hospital environment, vertically above an intensive care support 20, for example an operating table.

This ceiling mount comprises two ceiling mount arms 2 and 2', which may be articulated to the said base element 1. The ceiling mount arm 2 itself comprises two sub-parts 2a and 2b articulated together and giving the assembly greater flexibility. The two arms 2 and 2' are both equipped at their end with a column 3 of vertical axis (x-x') and of length α.

Support elements 5 are fixed to these columns 3 via fixing means 4, which fixing means 4 can be moved in terms of translation along the axis (x-x') and in terms of rotation about the said axis (x-x') as desired or as needed, this being achievable through very simple manipulations, as described in particular in documents FR-A-2408089 or FR 9702025.

By way of example, the care apparatus 21, medical equipment 23 and an element with drawers 22 have been placed on the said support elements 5.

It will be understood that this type of ceiling mount is adequate and suitable when the support elements 5 are intended to take apparatus or equipment that requires infrequent movement or merely rotation about the column 3 or along the axis (x-x') of the said column, this being in order to meet technical or therapeutic constraints or requirements.

However, this type of ceiling mount is insufficient when the apparatus or equipment is to be moved frequently from one treatment room to another, especially when the equipment concerned is heavy to move or, on the other hand, very fragile but has, in either event, to be handled as infrequently as possible in order not to risk damaging the equipment or injuring hospital staff.

FIGS. 2 to 5, for their part, propose a solution that allows these problems to be solved.

More specifically, FIGS. 2 to 5 depict an assembly consisting, on the one hand, of a ceiling mount S and, on the other hand, of a trolley C for transporting equipment, for example hospital apparatus and equipment.

The ceiling mount S comprises an arm 2 articulated to a base 1 connected to the ceiling 1' of a room in a hospital building, such as an intensive care room.

The arm 2 bears a column 3 of vertical axis (x-x') which is roughly cylindrical and on which reception means 32, the function of which will be detailed below, are arranged.

The column 3 may also comprise shelves or a module 50 for distributing medical fluids and/or electricity, as described in the prior art.

Furthermore, the trolley C comprises a trolley column 55 on which support means 41 to 41e, such as shelves, drawers or the like, are arranged.

The movement of the trolley C along the floor 1" of the treatment room is achieved by means of castors 30 borne by the bottom 56 of the trolley C, on which the trolley column 55 is fixed.

The trolley C further comprises attachment means 31 allowing the trolley to be fixed to the column 3 of the support S. More specifically, the said attachment means 31 cooperate with the receiving means 32 arranged on the column 3 of the ceiling mount S, so as to obtain effective, simple and quick anchorage of the trolley on the said column 3 of the mount fixed to the ceiling.

The trolley C also comprises, at the rear of the trolley column 55, retaining means 42 which have a bearing surface 43 that comes into contact with the ceiling mount column 3 when the trolley is anchored to the said ceiling mount column 3.

Figure 10:
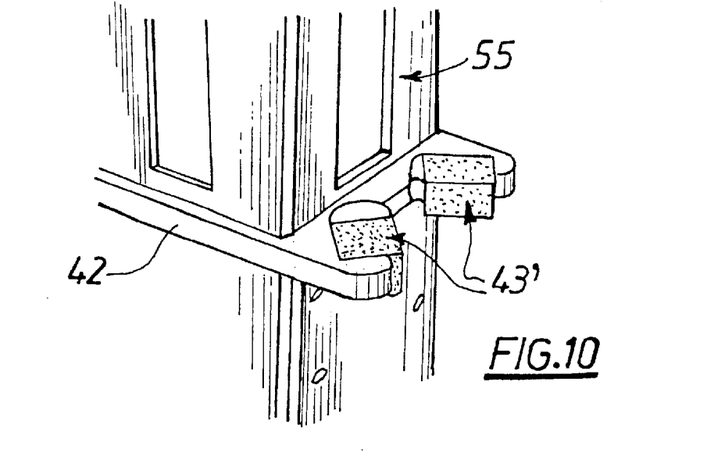
FIG. 10 illustrates part of a retaining means of a trolley.

As a preference, the bearing surface 43 has a V-shaped profile, the angle of which roughly corresponds to the profile of the column 3 or exceeds it, as shown in FIG. 10.

Once the trolley C has been anchored to the column 3, lifting means 33 borne by the trolley allow the trolley to be lifted by vertical translation so as to lift the trolley off the floor 1" of the treatment room.

More specifically, the trolley column 55 is formed of several elements (not detailed) cooperating with each other so as to allow the trolley C to be lifted once it has been fixed to the column 3 of the ceiling mount.

Thus, the trolley column 55 is formed as several, possibly 2 or 3, sub-parts which nest and slide in one another, that is to say telescopically. In other words, these sub-parts are retracted or deployed by sliding one inside another by the action of a builtin linear drive.

The telescopic movement of these sub-parts is provided by an electric motor, for example a hollow shaft motor 100, the rotational movement of which is converted into a linear movement by an appropriate system, such as a screw/nut system.

The translational or movement may be controlled either electrically, for example by means of external switches, or pneumatically.

Such elements are widely commercially available, particularly from the company MAGNETIC ANTRIEBTECHNIK, under the name TELEMAG.

Such a unit assembly consisting of the ceiling mount bearing the trolley for transporting medical equipment exhibits numerous advantages, such as, in particular, those of allowing easy movement of the trolley in the room when the trolley is laden with apparatus that is heavy and/or delicate to move, simply by moving the ceiling mount arm supporting the entire weight of the trolley.

Furthermore, the attachment means 31 and the receiving means 32 are detailed in FIGS. 6 and 9, and 7 and 8, respectively.

Figure 6:
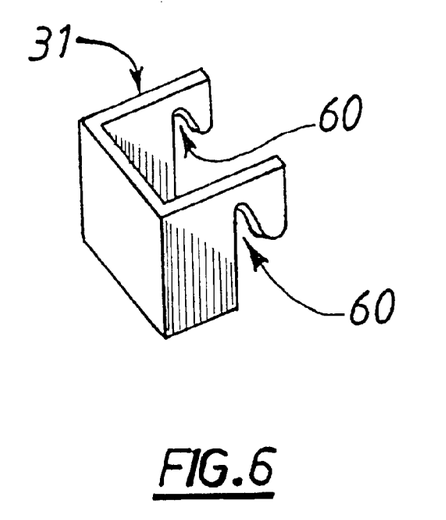
FIG. 6 illustrates a detailed view of an attachment means.
Figure 9:
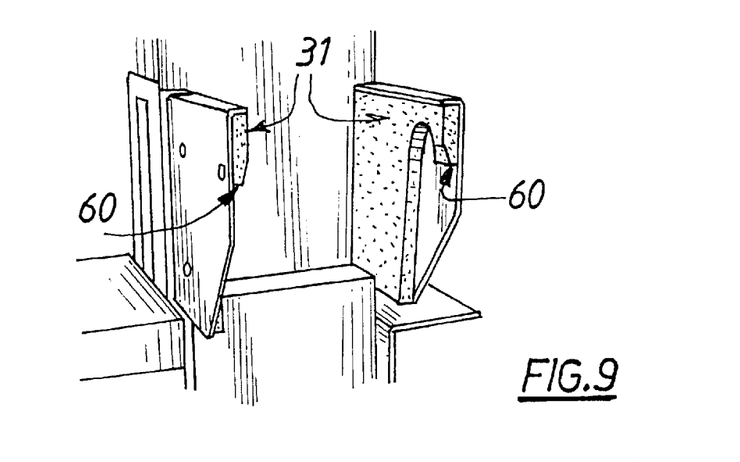
FIG. 9 illustrates another embodiment of an attachment means.

Thus, FIGS. 6 and 9 depict the attachment means 31 borne by the trolley column 55.

These attachment means 31 comprise two anchoring hooks 60, which hooks 60 can cooperate with the receiving means 32 borne by the column 3 of the ceiling mount and, in particular, with two attachment pins 61 each borne by a centring half-piece 62.

In fact, the two centring half-pieces 62 are held in position on the ceiling mount column 3 by means of several assembly screws 63 which, on the one hand, join the two half-pieces 62 together and, on the other hand, clamp the said two half-pieces 62 onto the said ceiling mount column 3.

When anchoring the trolley to the ceiling mount, the hooks 60 catch on the attachment pins 61 and the trolley is then raised off the floor by virtue of the operation of telescopically nesting the subparts 55a and 55b of the trolley column 55 inside one another.

In fact, it will be readily understood that once the trolley has been attached to the ceiling mount column using the attachment means 31 and the receiving means 32, the trolley can be lifted, that is to say lifted off the floor, by retracting just the lower part of the trolley, that is to say the sub-part 55b and all the other elements situated below this sub-part 55b, particularly the base 56 and the castors 30 by a vertical linear translation.

In order to improve the transfer and attachment of the trolley to the ceiling mount column 3, it is appropriate to improve the positioning of the trolley relative to the column 3 and therefore also the positioning of the trolley attachment means 31 relative to the receiving means 32 belonging to the column 3.

Figure 7:
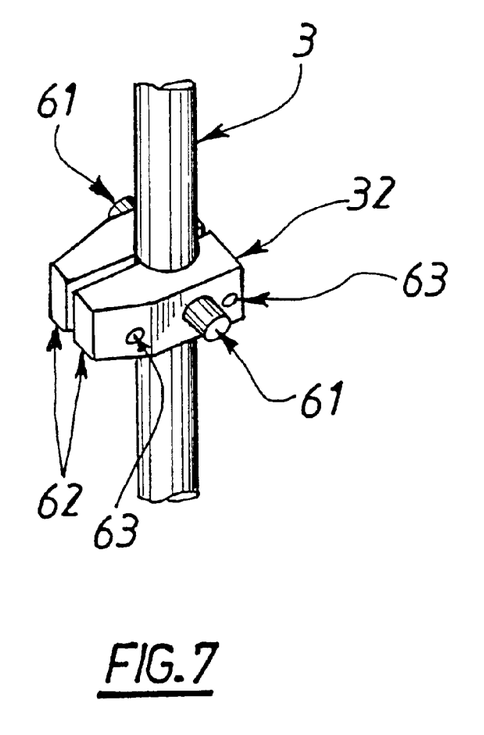
FIG. 7 illustrates a detailed view of attachment pins attached to a ceiling mount column.
Figure 8:
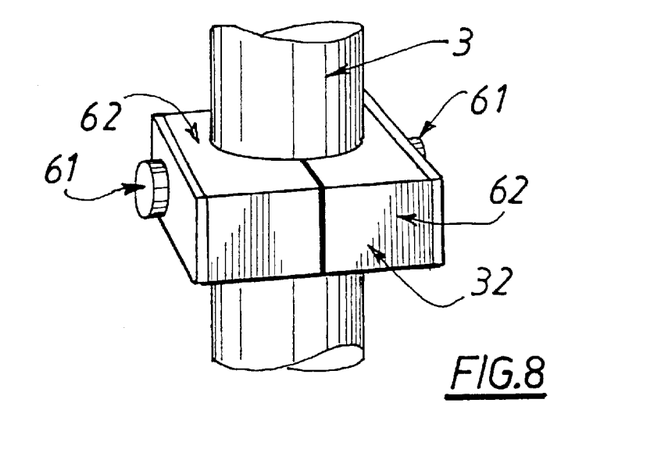
FIG. 8 illustrates another embodiment of attachment pins.

To do this, it is preferable that the attachment pins 61 should be able to rotate about their axis, that is to say that these attachment pins 61 should be turning or rotating rollers, as shown in FIGS. 7 and 8.

Figure 11:
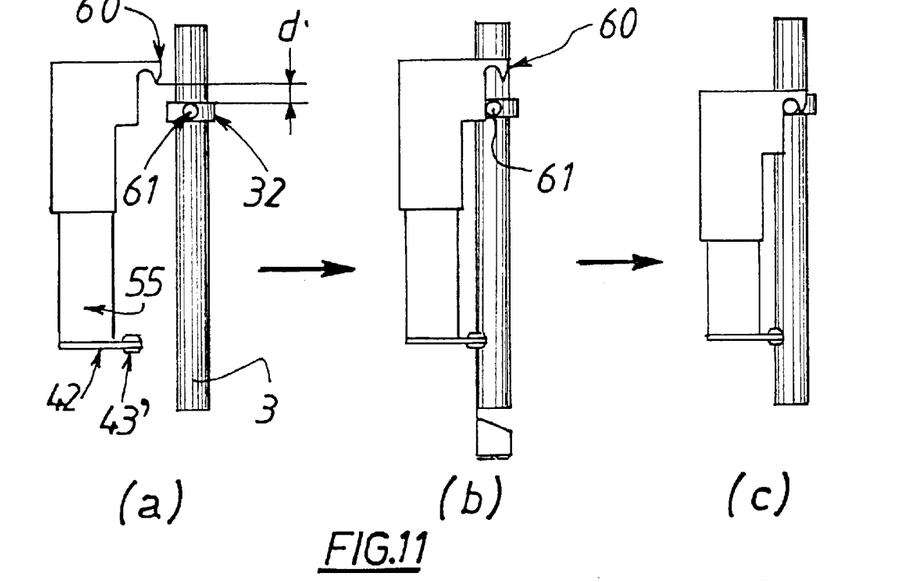
FIGS. 11(a)–(c) illustrate a trolley being attached to a ceiling mount column.

What happens, as explained above and depicted diagrammatically in FIG. 11, is that the trolley, having been anchored to the column 3, will bear against the said column via retaining means 42 which have a V-shaped bearing surface 43.

As shown in FIG. 10, the retaining means 42 comprise one or more sliding shoes 43' borne by the V-shaped bearing surface 43.

When the trolley needs to be fixed to the column, the procedure is as explained above and as depicted diagrammatically in FIGS. 11a to 11b, that is to say that:

the raising/lowering system is activated so as to correctly position the attachment means 31 with anchoring hooks 60 relative to the attachment pins 61 of the receiving means 32. During this stage, it can be seen in FIG. 11a that the anchoring hooks 60 are spaced vertically apart by a distance d with respect to the anchoring pins 61 or rollers.

the trolley is brought up close to the column until contact is achieved, that is to say until the sliding shoes 43' borne by the V-shaped bearing surface 43 belonging to the said retaining means 42 come to bear against or come into contact with the vertical shaft of the column 3, as shown in FIG. 11b. Thus, the hooks 60 and the pins 61 find themselves in the correct position relative to one another.

finally, the raising/lowering system is activated in the opposite direction to the first manipulation, and this causes the anchoring hooks 60 to be lowered, come into contact with the rollers or pins 61 and catch on them, as shown in FIG. 11c, which then allows the trolley to be raised and therefore lifted off the floor.

Figure 12:
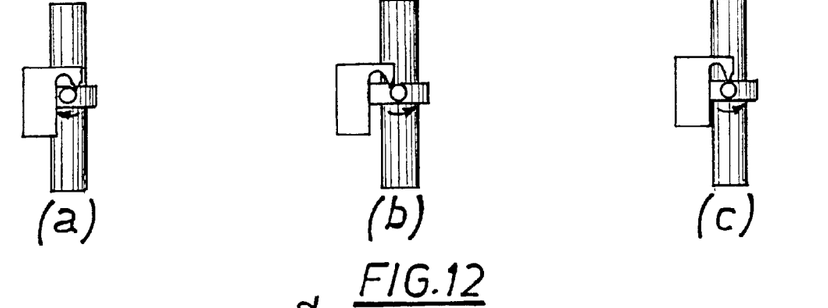
FIGS. 12(a)–(c) illustrate an attachment means making contact with rolling attachment pins.

By employing, as a matter of preference, rotating rollers or pins 61, as mentioned herein above, the system can be improved because, as depicted diagrammatically in FIGS. 12a to 12c, when:

the anchoring hooks 60 have slipped behind the axis of the rollers or pins 61, the said hooks 60 can attach correctly on the rollers 61, given that the sloping interior surfaces of the said hooks cause the rollers 61 to rotate in the clockwise direction and effective anchorage can be achieved (the scenario of FIG. 12a).

the anchoring hooks 60 are in front of the axis of the rollers or pins 61, the said hooks 60 cannot catch on the rollers 61, given that the sloping exterior surfaces of the said hooks cause the rollers 61 to rotate in the anti-clockwise direction. In consequence, the trolley cannot be anchored and therefore remains on the floor, and the operator therefore has to correctly reposition the trolley with respect to the column (the scenario in FIG. 12b).

the anchoring hook 60 catch on the axis of the rollers or pins 61 (the scenario of FIG. 12a), then either there is rotation in the clockwise direction, as in the scenario of FIG. 12a, and the trolley becomes correctly anchored or, on the other hand, the said hooks 60 cannot catch correctly on the rollers 61, like in the scenario in FIG. 12b, and the trolley therefore remains on the floor and has to be repositioned so that it can be raised.

In any event, by proceeding in this way, there is practically no risk of the trolley being dropped by accidental detachment because either it is correctly positioned and therefore remains firmly fixed to the column 3, or it is poorly anchored and, in this case, the rollers 61 start to rotate and thus prevent the trolley from being able to be lifted in this way.

As a preference, the shape of the rollers 61 and of the hooks 60 is chosen so as to ensure unstable equilibrium in the scenario of FIG. 12c, so as to resist hammering stresses on trolley/column contact and to engage or, conversely, disengage the trolley gently.

For example, the rotary rollers 61 may have a diameter of 15 to 60 mm, preferably of the order of 35 mm.

Figure 13:
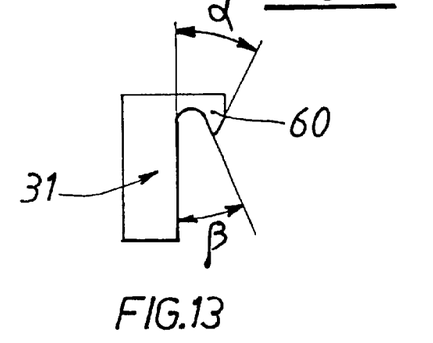
FIG. 13 illustrates details of an attachment means.

Furthermore, as shown in FIG. 13, the hooks 60 may have internal and external slopes which make angles α and β of between 15° and 60°, preferably angles α and β of the order of 25° to 30°, with the axis of the column 3.

Figure 2:
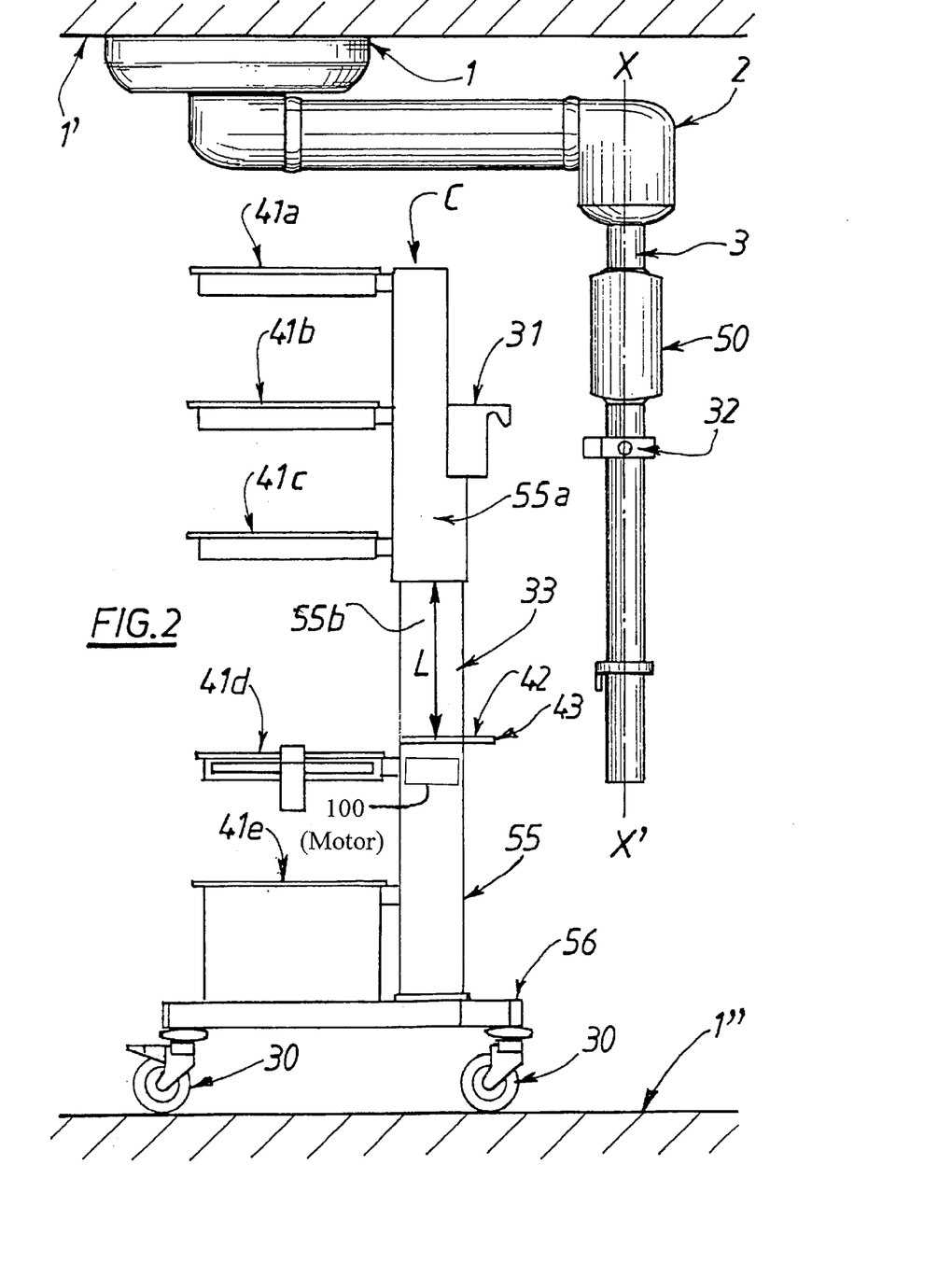
FIG. 2 illustrates a ceiling mount S and a trolley C for transporting equipment.

In FIG. 2, the trolley C, depicted in a side view, is still placed on the floor 1" of the room. By contrast, FIG. 4 depicts the trolley C anchored to the column 3 after the castors 30 have been lifted (arrows 60').

Figure 3:
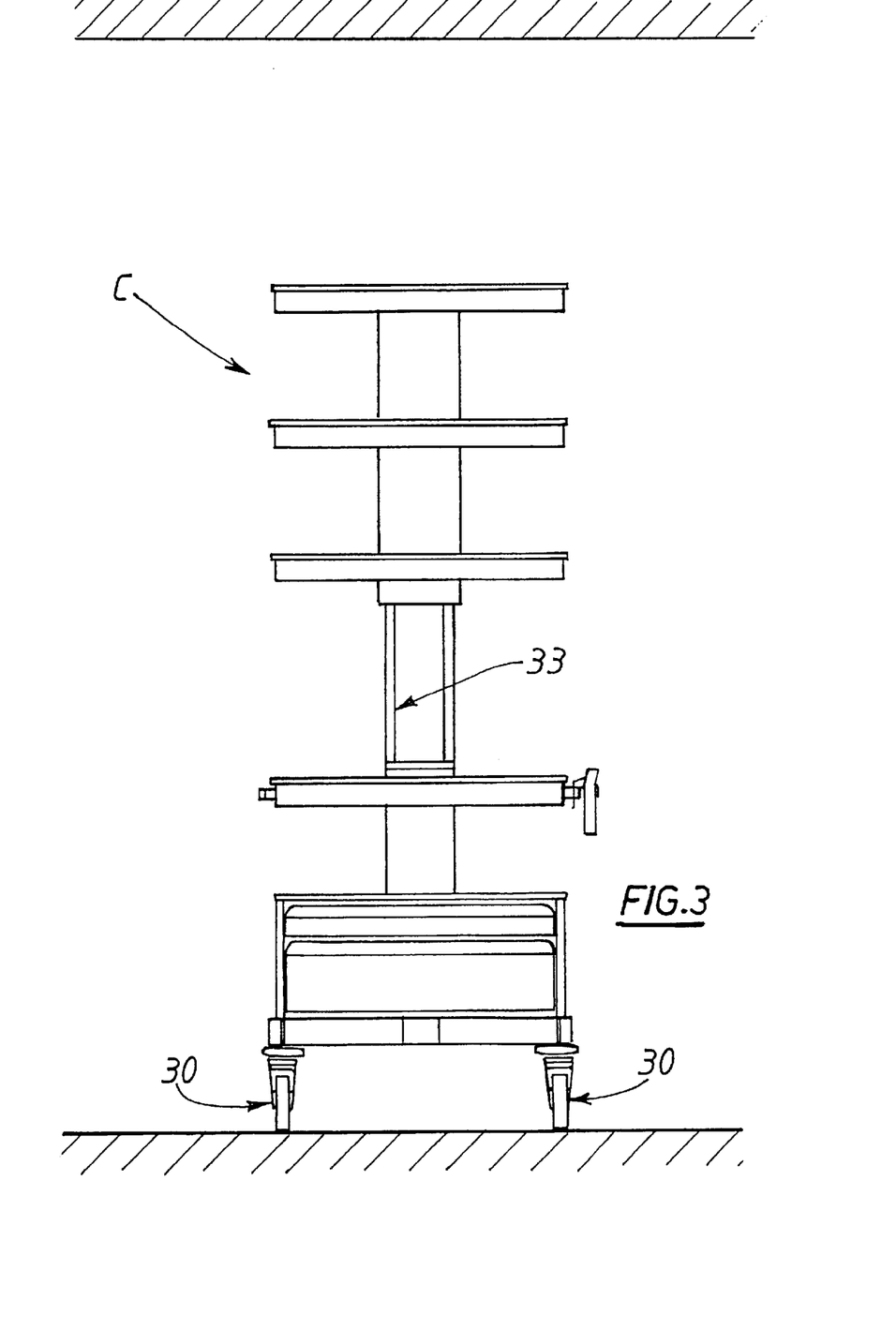
FIG. 3 illustrates a front view of a trolley.
Figure 4:
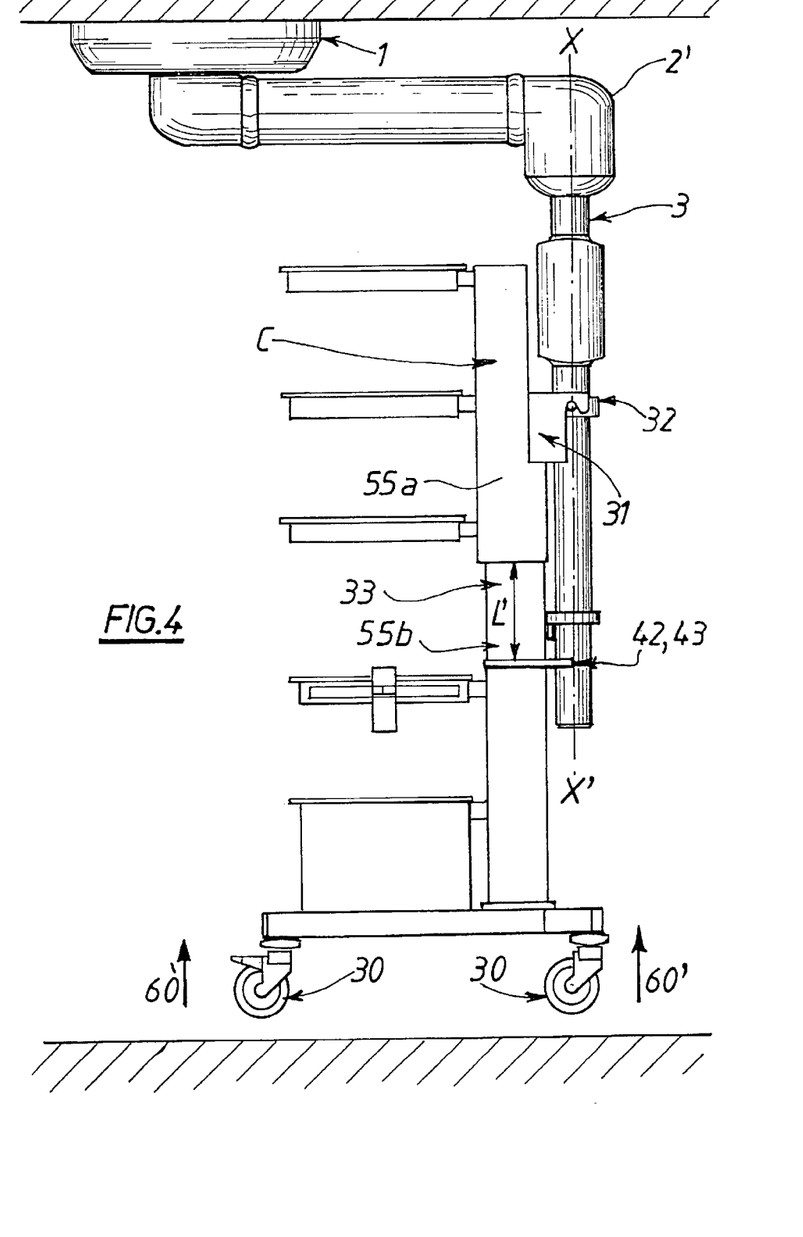
FIG. 4 illustrates a trolley attached to a ceiling mount.
Figure 5:
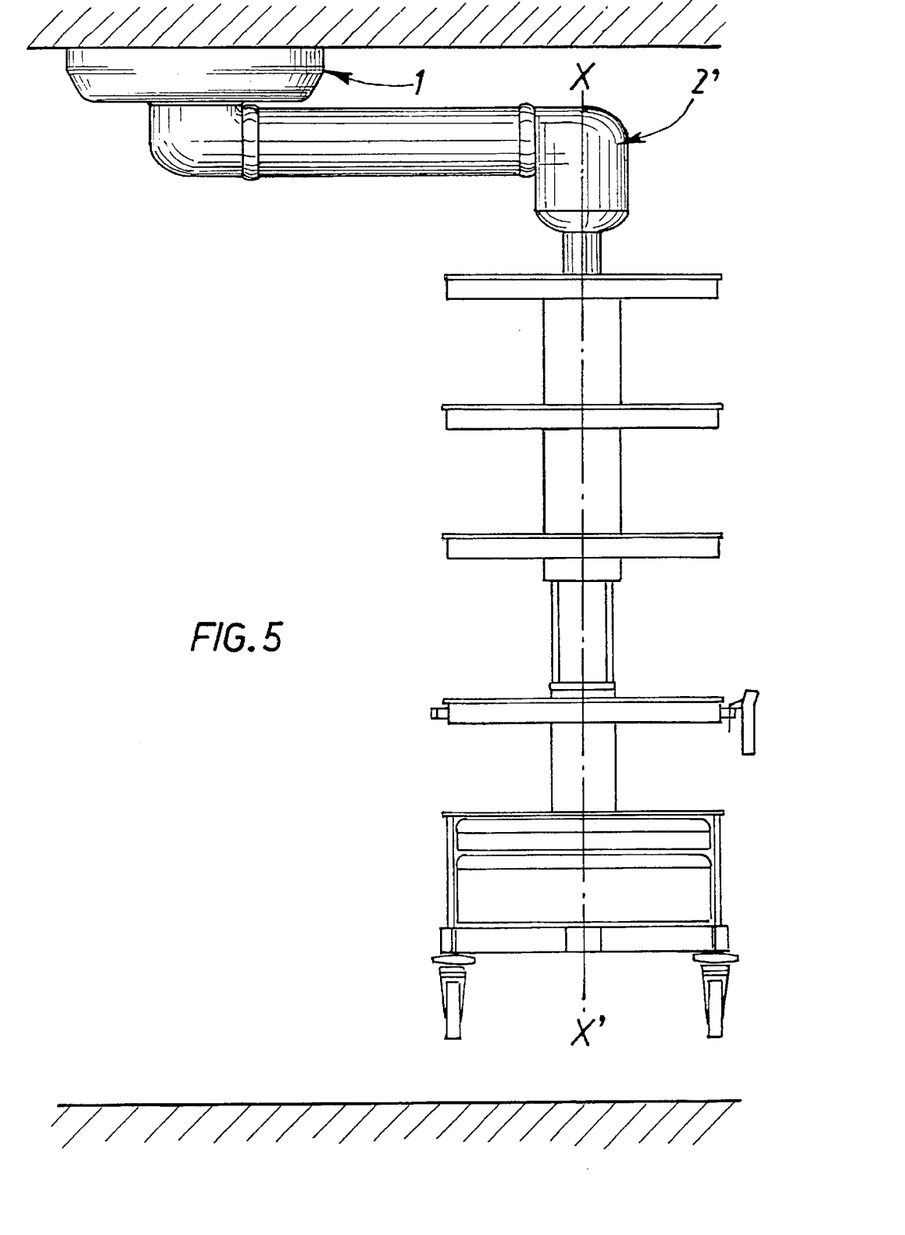
FIG. 5 illustrates a front view of a trolley attached to a ceiling mount.

Furthermore, FIG. 3 depicts the trolley C of FIG. 2, viewed face-on, before it is fixed to the column 3, whereas FIG. 5 depicts the trolley, also viewed face-on, after it has been anchored to the column, as depicted in FIG. 4.

It can clearly be seen in FIGS. 4 and 5 that once the transport trolley has been anchored to the column and lifted, the trolley no longer touches the floor 11" and that the trolley can therefore easily be moved simply by moving the arm 2 and/or the column 3 of the ceiling mount S.

Furthermore, it can also be seen, by comparing FIGS. 2 and 4, that in FIG. 4, the sub-part 55b has a length L' that is shorter than the length L that this part has in FIG. 2.

This is because FIG. 4 depicts the trolley after lifting, and therefore in a position in which the sub-part 55b is partially nested by sliding inside the sub-part 55a, as explained above.

What is claimed is:

1. Support structure/transport trolley assembly comprising:
   a support structure (S) comprising at least one arm (2) equipped with at least one column (3) of vertical axis (x-x') and fixing means (1) allowing the support structure (S) to be fixed to a ceiling (1') or to a wall,
   a mobile transport trolley (C),
   attachment means (31) borne by the trolley (C) cooperating with receiving means (32) borne by the column (3) and capable of allowing the trolley (C) to be fixed to the column (3), and
   lifting means (33) borne by the trolley (C) capable of lifting at least a part of the trolley (C) in contact with a floor surface away from said floor surface after the trolley (C) has been fixed to the column (3).

2. Assembly according to claim 1, wherein the lifting means (33) comprises a trolley column (55) comprising at least two sub-parts (55a, 55b) capable of nesting together and sliding one inside the other in a translational movement.

3. Assembly according to claim 1, wherein the trolley (C) is lifted by means of an electric motor, the rotational movement of which is converted into a translational movement by a conversion system.

4. Assembly according to claim 1, wherein the attachment means (31) comprise at least one attachment hook (60).

5. Assembly according to claim 1, wherein the receiving means (32) fixed to the column (3) comprise at least one attachment pin (61), said at least one attachment pin (61) being able to cooperate with at least one hook (60) borne by the trolley (C).

6. Use of a support structure/trolley assembly according to claim 1 in a hospital building.

7. Assembly according to claim 2, wherein the trolley furthermore comprises retaining means (42) arranged on the trolley column (55) allowing the trolley (C) to be kept pressed against the column (3) at least when the trolley (C) is fixed to the column (3) and is raised off the floor surface.

8. The assembly of claim 2, wherein the transnational movement is essentially vertical.

9. Assembly according to claim 3, wherein the electric motor is borne by the trolley (C).

10. The assembly of claim 3, wherein the conversion system comprises a screw/nut system.

11. Assembly according to claim 7, wherein the column (3) is essentially cylindrical and the retaining means (42) are provided with a bearing surface (43) that comes into contact with the column (3).

12. The assembly of claim 4, wherein the attachment hooks number at least two.

13. The assembly of claim 5, wherein the attachment pins number at least two.

14. The assembly of claim 13, wherein the attachment pins are rotatable.

15. Mobile transport trolley (C) capable of being used in connection with an attachment structure having a vertical column, the mobile transport trolley comprising castors (30), allowing the trolley to move along a floor surface, attachment means (31) capable of allowing the trolley (C) to be fixed to the column (3) of the attachment structure (S) and lifting means (33) capable of raising at least a part of the trolley in contact with the floor surface away from the floor surface when the trolley (C) is fixed to the column (3).

16. Method for fixing a mobile transport trolley to a support structure (S) comprising at least one arm (2) equipped with at least one column (3) arranged along a vertical axis (x-x') and fixing means (1) allowing the support structure (S) to be fixed to a ceiling (1') or to a wall, in which, said method comprising the steps of:
   providing said mobile transport trolley comprising an attachment means for attaching the trolley to the column and a lifting means, the trolley being in contact with a floor surface,
   bringing the mobile transport trolley (C) into contact or close proximity with the column (3),
   fixing the attachment means (31) borne by the trolley to a receiving means (32) arranged on the column (3) so as to make the attachment means (31) cooperate with the said receiving means (32),
   lifting at least part of the trolley (C) by activating the lifting means (33) in such a way as to raise at least part of the trolley (C) in contact with the floor surface away from the floor surface.

* * * * *